United States Patent
Arnold et al.

[11] Patent Number: 6,110,312
[45] Date of Patent: Aug. 29, 2000

[54] PROCESS OF MAKING A SEAL AND APPARATUS FOR SEALING DOUBLEWIDE MANUFACTURED HOMES

[76] Inventors: Gregory A. Arnold; Jamie C. Arnold, both of 306 Pine St., Aburndale, Fla. 33823

[21] Appl. No.: 09/428,860

[22] Filed: Oct. 28, 1999

Related U.S. Application Data

[63] Continuation-in-part of application No. 08/999,198, Dec. 29, 1997, abandoned.

[51] Int. Cl.[7] ..................................................... B32B 31/02
[52] U.S. Cl. .......................... 156/204; 156/226; 428/71; 428/126
[58] Field of Search ..................................... 156/201, 202, 156/204, 226; 428/126, 71; 49/475.1

[56] References Cited

U.S. PATENT DOCUMENTS

| | | |
|---|---|---|
| 1,675,844 | 7/1928 | Dennis . |
| 1,742,195 | 1/1930 | Bosley . |
| 2,028,253 | 1/1936 | Spafford ................................. 428/126 |
| 2,827,280 | 3/1958 | Burkhalter . |
| 3,170,967 | 2/1965 | Williams . |
| 3,413,389 | 11/1968 | Footner . |
| 4,084,348 | 4/1978 | Hast . |

*Primary Examiner*—Alexander S. Thomas
*Attorney, Agent, or Firm*—William M. Hobby, III

[57] ABSTRACT

A process for making a sealing material for sealing doublewide manufactured homes includes the steps of selecting an elongated seal core made of a foamed polymer and selecting a flexible polymer covering sleeve for loosely covering the selected seal core and covering the seal core with a loose fitting covering sleeve. The covering sleeve is then shaped to form a skin over the seal core by forming a pair of flanges from the slack material in the covering sleeve with a folded portion of the covering sleeve and attaching the folded portions together to form flanges. A seal for a doublewide manufactured home is formed by the process and has an elongated polymer foam core covered by an elongated flexible polymer sleeve and having a pair of elongated flanges formed with folded slack material in the flexible polymer sleeve which folded flange portions are attached together, such as by sewing. A predetermined density foam core material of a larger size is covered with a woven polypropylene material.

3 Claims, 2 Drawing Sheets

PROCESS OF MAKING A SEAL AND APPARATUS FOR SEALING DOUBLEWIDE MANUFACTURED HOMES

This application is a continuation-in-part of Ser. No. 08/999,198, filed Dec. 29, 1997, now abandoned.

This invention is a continuation-in-part of my prior patent application Ser. No. 08/999,198, filed Dec. 29, 1997, which application is a division of U.S. Pat. No. 5,720,146, issued Feb. 24, 1998.

BACKGROUND OF THE INVENTION

The present invention relates to a process for sealing doublewide manufactured homes and modular homes sections together and especially to a process of making a sealing material having a thick foamed polymer material wrapped with a flexible polymer material.

Manufactured homes are those in which a home or building is manufactured at a central location or factory where it can then be loaded onto a tractor-trailer and hauled to a purchaser's home site. At the home site, the manufactured home can be mounted onto a prepared foundation. Manufactured homes, in contrast to custom homes, have the advantages of mass production at one factory site where they can obtain the benefits of volume purchasing, more efficient assembly through standard jigs, fixtures, and machinery, and can have a more advanced engineering design. One of the problems with manufactured homes has been in making a home of a size and shape that can be hauled over a highway. This limits the width of the home and thus limited the homes to smaller elongated units. To overcome this limitation, double wide manufactured homes were developed which use a pair of manufactured home sections, each of which can be the same size as one manufactured home but without one wall so that doublewide manufactured home sections can be individually hauled to a home site where the two sections can be brought together and attached to form a manufactured home which does not have the customary elongated shape of a typical manufactured home. This allows for larger homes which can have additional design features to make the home look more like a custom home.

In recent years, doublewides have become increasingly popular but have also had various problems attached with them including the proper attachment of the doublewide sections together to form one unit which attachments must appear seamless and at the same time need to be well sealed from the exterior weather elements. Common doublewides today are attached together and are caulked around the perimeter of the attaching line or, alternatively, are shot with an expanding polymer caulk to seal the perimeter. One of the difficulties in sealing a pair of doublewides is that the seam around the attached sections tends to vary in width on the outside so that conventional caulk is not always satisfactory and expanding foam tends to weather and does not always give a weatherproof seal.

The present invention improves the sealing in doublewide manufactured homes along the perimeter of the attached sections which not only gives a good seal against the weathering elements but also will not deteriorate in the manner of other materials currently being used.

Prior art sealing strips for forming a variety of seals, but not seals for manufactured home doublewides, can be seen in the U.S. Pat. No. 4,084,348, to Hast, for a sealing strip which has a cylindrical shape having a resilient core of foamed plastic surrounded by a foil of PVC or polyethylene and an outer covering of textile fabric and in which the outer covering and the foil are attached together to form a flange which also has an adhesive strip attached thereto. The L. N. Williams et al. U.S. Pat. No. 3,170,967, and R. A. Footner U.S. Pat. No. 3,413,389, each teach a method of making a sealing strip using a polyvinyl foam having a polyvinyl resin skin outer layer. In the Burkhalter U.S. Pat. No. 2,827,280, a resilient bumper is made of a cylindrical rubber resilient core having a tubular sheath closure and which are attached together with a grommet therebetween. These prior art seals are not suitable for use in sealing doublewide sections which requires a much thicker sealing strip with greater flexibility and with a more flexible cover in order to be able to give a seal with wide variations in the spacing between the doublewide sections at different points around the perimeter of the assembled doublewide home.

It is accordingly an object of the present invention to provide a process of sealing doublewide manufactured home sections together with a selected sealing material custom formed for sealing doublewides which can be rapidly attached to one section of the doublewide before the doublewide sections are attached together. A polyurethane polymer of approximately 1.2 density is enclosed with a woven polypropylene which is attached with one edge folded over the other and sewn together to form the flange with one sewing strip giving greater strength to the flange.

SUMMARY OF THE INVENTION

A process for making a sealing material for sealing doublewide manufactured homes includes the steps of selecting an elongated seal core made of a foamed polymer and selecting a flexible polymer covering sleeve for loosely covering the selected seal core and covering the seal core with a loose fitting covering sleeve. The covering sleeve is then shaped to form a skin over the seal core by forming a pair of flanges from the slack material in the covering sleeve with a folded portion of the covering sleeve and attaching the folded portions together to form flanges. A seal for a doublewide manufactured home is formed by the process and has an elongated polymer foam core covered by an elongated flexible polymer sleeve and having a pair of elongated flanges formed with folded slack material in the flexible polymer sleeve which folded flange portions are attached together, such as by sewing. A predetermined density foam core material of a larger size is covered with a woven polypropylene material.

BRIEF DESCRIPTION OF THE DRAWINGS

Other objects, features, and advantages of the present invention will be apparent from the written description and the drawings in which.

DESCRIPTION OF THE PREFERRED EMBODIMENTS

Figure 1:
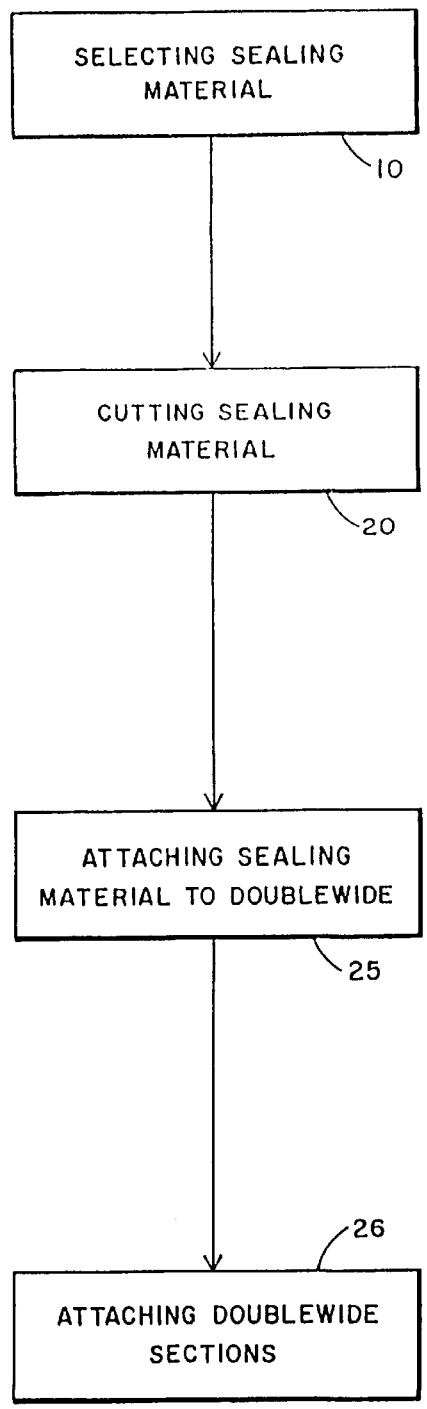
FIG. 1 is a flow diagram of a process of attaching doublewide manufactured home sections in accordance with the present invention.
Figure 2:
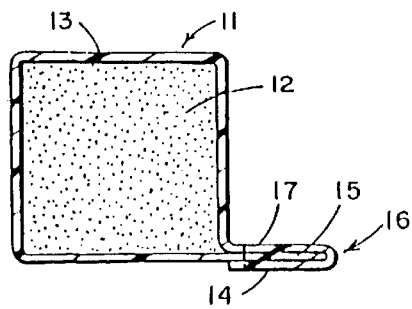
FIG. 2 is a sectional view taken through the sealing material used in the present invention.

Referring to the drawings, FIGS. 1–5, a process of sealing a pair of doublewide manufactured home sections together is illustrated in which the first step is selecting the sealing material 10 of FIG. 1. The selected material 11, as shown in FIG. 2, has a foamed polymer, such as polyurethane, having a 1.2 density to allow great flexibility in conforming to a sealing shape. In FIG. 2, the cross-section shows that the foamed polymer 12 has an approximately square shape and has a cover 13 wrapped therearound. The cover is made of a woven polypropylene, which may have an ultraviolet blocking material incorporated therein. The woven polypropylene has the advantages of being a very flexible material resistant to weathering elements and not subject to the break-up that might result to the polyurethane foam 12. In addition, it can be sewn together and provides the needed flexibility since the cover 13 is not attached to the foam 12 but is merely wrapped therearound with the edges attached together.

Figure 3:
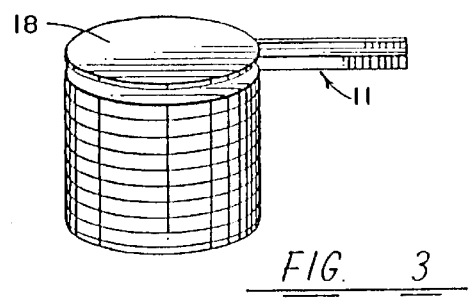
FIG. 3 is a perspective view of a roll of sealing material having the end being rolled off of a spool for measuring and cutting.

As seen in FIG. 2, one folded edge 14 of the material 13 has a second folder edge 19 and has been folded over and around the two edges 15 of the material 13, after being wrapped around the foamed polyurethane core 12. The attachment of the flexible wrapping material in this manner provides a flange 16 having six layers of woven polypropylene covering material which is sewn with the stitches 17 through the six layers which thereby seals the material around the foamed polymer core 12 and holds the flange together with one stitched line located adjacent the foamed core material 12. This material can advantageously be prepared in large or smaller quantities and can then be packaged on large spools or drums 18, as shown in FIG. 3, where the material 11 can be reeled off the drum 18 where it can be measured and cut in accordance with the step 20 of the process of FIG. 1.

Figure 4:
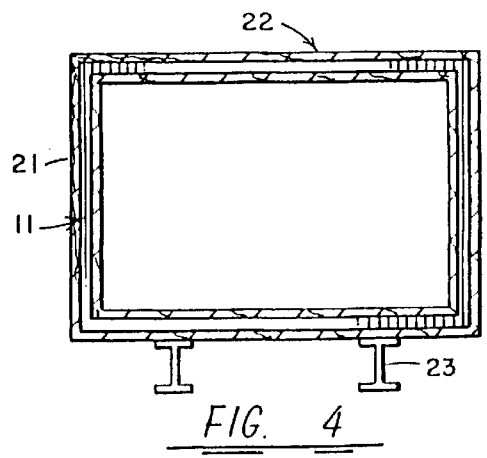
FIG. 4 is a side elevation of a doublewide manufacturing home section having the present sealing material attached thereto.
Figure 5:
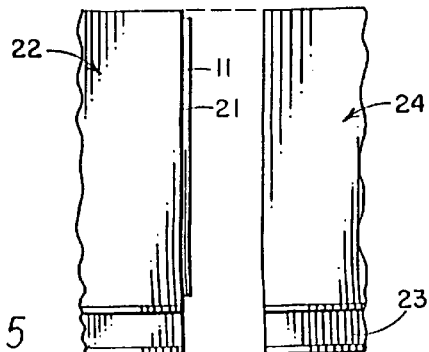
FIG. 5 is a partial side elevation of a pair of doublewide sections being brought together.

Once the material is cut from the spool 18, the flange 16 can be stapled through the six layers of the flange to the attaching wall section 20 of a doublewide manufactured home section 22, which is shown in FIG. 4 supported on a pair of I-beams 23. The sealing strip 11 is attached around the perimeter of the doublewide section 22 so that when a pair of doublewide sections 22 and 24 are attached with the sealing material therebetween.

The doublewide sections 22 and 24 are brought together while supported on an I-beam 23 and are attached together to form one doublewide manufactured home. The attachment of the sealing material strip 25 to the doublewide section can be accomplished in any way desired but powered staplers provide a convenient means and, because of the strength of the woven polypropylene formed in six layers in the flange, a secure attachment can be accomplished.

The seal can be attached at the factory or on site during the assembly of the doublewide sections 22 and 24 where the seals are conventionally added to the doublewide sections. The attaching of the doublewide sections strip 26 can be rapidly accomplished and because of the thickness of the foamed polyurethane 12 forming the sealing material and because of the amount of air incorporated into the polyurethane to provide a density of 1.2. The polyurethane can be compressed and expanded with great flexibility over wide variations in the sealing gap. The polyurethane foamed material may be of a thickness of 2.54 centimeters or greater. The seal tends to seal any space between the doublewide sections from a very tight fit up to a 3.8 centimeter space to thereby tightly seal between the doublewide sections to prevent the intrusion of weather elements as well as to block the ingress of insects or the like.

Figure 6:
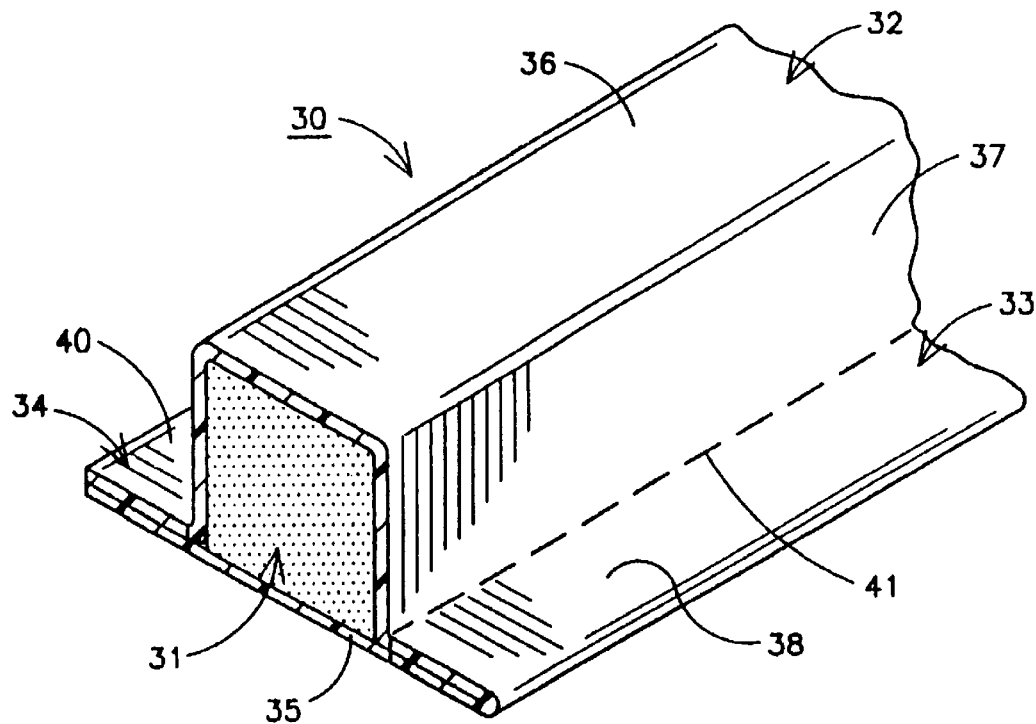
FIG. 6 is a perspective view of another embodiment of sealing material for sealing doublewide manufactured homes.
Figure 7:
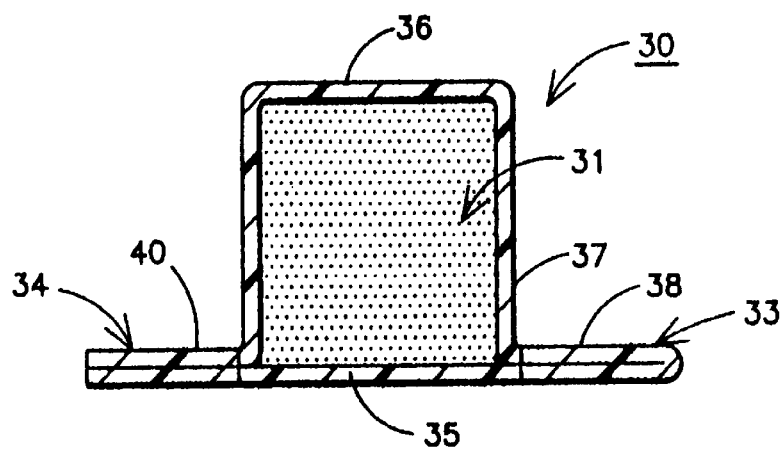
FIG. 7 is a sectional view taken through sealing material of FIG. 6.

Turning now to FIGS. 6 and 7, a second embodiment of the sealing material 30 is illustrated having a foamed polymer material 31, such as a polyurethane, having a 1.2 density to allow great flexibility in conforming to a sealing shape. The foamed polymer 31 is covered with a flexible skin 32 made of a woven polypropylene having an ultraviolet blocking material incorporated therein. The skin 32 is formed, such as to have a folded flange 33 on one side and a folded flange 34 on the other side thereof. The skin 32 has a base 35 forming the bottom of the folded flanges 33 and 34 and a top skin 36, a pair of side skins 37. The flange 33 has a top flange portion 38 and the flange 34 has a top flange portion 40. The folded flange portions 33 and 34 are held in the folded position by sewing the upper and lower flange portions together with a thread 41 but can also be held together with an adhesive which is flexible when cured. The seal 30 can then be stapled through both flanges for sealing the area between a doublewide and holding the foamed polymer 31.

The sealing material 30 can be easily manufactured by having a piece of foamed polymer material 31, which can be of a generally square shape as illustrated, covered with a loose flexible sleeve of woven polypropylene, which is considerably larger than the perimeter of the foamed core material 31, such that the material can be folded down to form a flexible but tight skin over the foamed polymer 31 and the slack material forming two equal flanges 38 and 40 of folded polymer material which can then be sewn together so that the flexible skin tightly fits around the foam center 31 while providing two reinforced flanges. The flanges can be used for stapling both sides of the seal to one side of a doublewide manufactured home.

It should be clear that the embodiment of FIGS. 6 and 7 improve the ease of manufacturing of a sealing material and, at the same time, provides a greater support of the material to the doublewide by having a reinforced flange on either side which can be stapled on both sides. However, the present invention should not be limited to the forms shown which are to be considered illustrative rather than restrictive.

I claim:

1. A process for making a sealing material for sealing doublewide manufactured homes comprising the steps of:

selecting an elongated seal core made of a foamed polymer having a generally square cross section;

selecting a flexible polymer covering sleeve of flexible woven polypropylene sized for loosely covering said selected seal core;

covering said selected seal core with said loose fitting covering sleeve to thereby leave slack material between said seal core and said polymer covering sleeve;

shaping said loose fitting covering sleeve to said seal core by forming a pair of flanges with the slack in said covering sleeve with a folded portion of said covering sleeve; and attaching said folded portions of each said flange together; whereby a doublewide sealing material is formed with two flanges for sealing between doublewide sections of a doublewide manufactured home.

2. A process for making a sealing material for sealing doublewide manufactured homes in accordance with claim 1 in which the step of selecting an elongated seal core includes selecting an elongated polymer foam material at least 2.5 centimeters thick.

3. A process for making a sealing material for sealing doublewide manufactured homes in accordance with claim 2 in which the step of selecting an elongated seal core includes selecting an elongated seal core of polyurethane of approximately 1.2 density.

* * * * *